US008159723B2

(12) United States Patent
Yamada

(10) Patent No.: US 8,159,723 B2
(45) Date of Patent: Apr. 17, 2012

(54) PRINT CONTROL DEVICE AND RECORDING MEDIUM CONTAINING PROGRAM FOR CONTROLLING PRINTING DEVICE

(75) Inventor: Kazutaka Yamada, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 717 days.

(21) Appl. No.: 11/960,952

(22) Filed: Dec. 20, 2007

(65) Prior Publication Data

US 2008/0151279 A1 Jun. 26, 2008

(30) Foreign Application Priority Data

Dec. 22, 2006 (JP) ................. 2006-345792

(51) Int. Cl.
*H04N 1/40* (2006.01)
(52) U.S. Cl. ...................... 358/3.28; 358/468
(58) Field of Classification Search .......... 358/1.9, 358/2.1, 3.28, 406, 504, 468; 347/107
See application file for complete search history.

(56) References Cited

U.S. PATENT DOCUMENTS

| 6,252,971 | B1 | 6/2001 | Wang |
| 7,084,903 | B2 | 8/2006 | Narayanaswami et al. |
| 7,262,870 | B1 | 8/2007 | Namikata |
| 2003/0011684 | A1 | 1/2003 | Narayanaswami et al. |
| 2004/0258277 | A1 | 12/2004 | Ueda |
| 2006/0075460 | A1 | 4/2006 | Anegawa et al. |
| 2006/0132824 | A1 | 6/2006 | Aritomi |
| 2006/0227355 | A1 | 10/2006 | Wadhwa et al. |

FOREIGN PATENT DOCUMENTS

| JP | 11-298717 A | 10/1999 |
| JP | 2000-032254 A | 1/2000 |
| JP | 2000-041144 A | 2/2000 |
| JP | 2000-307851 A | 11/2000 |
| JP | 2002-077600 | 3/2002 |
| JP | 2002-077600 A | 3/2002 |
| JP | 2002-215798 A | 8/2002 |
| JP | 2003-025684 A | 1/2003 |
| JP | 2005032237 A | 2/2005 |
| JP | 2005-269055 | 9/2005 |
| JP | 2005-277786 | 10/2005 |
| JP | 2006-171830 | 6/2006 |
| JP | 2006-209198 | 8/2006 |
| JP | 2006202269 A | 8/2006 |
| JP | 2006-294030 A | 10/2006 |
| WO | 2005/031560 A1 | 4/2005 |

OTHER PUBLICATIONS

JP Office Action dtd May 12, 2009, JP Appln. 2006-345792.
JP Office Action dtd Oct. 28, 2008, JP Appln. 2006-345792.

*Primary Examiner* — Thomas D Lee
*Assistant Examiner* — Stephen M Brinich
(74) *Attorney, Agent, or Firm* — Banner & Witcoff, Ltd.

(57) ABSTRACT

A print control device capable of controlling a printer to execute a printing operation is provided with a data converting module configured to convert job data output by an application and print setting data set by the control device into print data, a search condition defining module configured to define a search condition, a searching module configured to search the print setting data based on the search condition set by the search condition setting module, and an executing module configured to execute a predetermined operation when the print setting data meets the search condition.

8 Claims, 7 Drawing Sheets

PRINT CONTROL DEVICE AND RECORDING MEDIUM CONTAINING PROGRAM FOR CONTROLLING PRINTING DEVICE

CROSS-REFERENCE TO RELATED APPLICATION

This application claims priority under 35 U.S.C. §119 from Japanese Patent Application No. 2006-345792 filed on Dec. 22, 2006. The entire subject matter of the application is incorporated herein by reference.

BACKGROUND

1. Technical Field

The following description relates to a print control device which is configured to control a printing device. Specifically, the description relates to a print control device capable of generating print data based on not only data created by applications, but print setting data created in the printing device. The invention also relates to a computer accessible recording medium containing a program, which, when executed by the computer, causes the computer to serve as the print control device.

2. Related Art

Conventionally, there is known a print control device capable of generating print data by combining data created by an application and data representing a predetermined image, for example, a watermark indicating "FOR INTERNAL USE ONLY."

When the watermark including character strings such as "FOR INTERNAL USE ONLY" has been already been included in the data created by the application, in view of security, printing of the data should be restricted and/or a notification should be transmitted to an administrator. An example of such a technique is disclosed in Japanese Patent Provisional Publication No. 2002-77600 (hereinafter, referred to as '600 publication).

SUMMARY

According to '600 publication, the character strings to be synthesized with data created by the application (hereinafter, referred to as "job data") are searched within the data (i.e., job data) created by the application. However, if the watermark (e.g., "FOR INTERNAL USE ONLY") is synthesized by a print control device (e.g., a printer driver), after the job data was created by the application, such a watermark cannot be detected according to the technique disclosed in '600 publication. In such a case, a document with the watermark (e.g., "FOR INTERNAL USE ONLY") is printed out and the document (even if it is not a formal document) will be distributed as if it is the formal document.

In consideration of the above problem, the present invention is advantageous in that an improved print control device is provided, with which a predetermined operation (e.g., inhibition of printout) can be executed if the print setting data (e.g., watermark) added by the printing device is predetermined data.

According to aspects of the present invention, there is provided a print control device capable of controlling a printer to execute a printing operation, which is provided with a data converting module configured to convert job data output by an application and print setting data set by the control device into print data, a search condition defining module configured to define a search condition, a searching module configured to search the print setting data based on the search condition set by the search condition setting module, and an executing module configured to execute a predetermined operation when the print setting data meets the search condition.

According to another aspect of the invention, there is provided a computer accessible recording medium containing instructions that cause a computer to control a printer to execute a printing operation, the instructions including the steps of converting job data output by an application and print setting data representing print settings generated by a printer driver into print data, defining a search condition, searching the print setting data based on the search condition set by the step of defining the search condition, and executing a predetermined operation when the print setting data meets the search condition.

According to a further aspect of the invention, there is provided a method for controlling a printer to execute a printing operation. The method is provided with the steps of converting job data output by an application and print setting data representing print settings generated by a printer driver into print data, defining a search condition, searching the print setting data based on the search condition set by the step of defining the search condition, and executing a predetermined operation when the print setting data meets the search condition.

With the above configurations, the print setting data which is not created by the applications but added to the job data created by the application is examined to judge whether predetermined character strings are included therein. Then, based on the search results, predetermined operations can be executed.

BRIEF DESCRIPTION OF THE ACCOMPANYING DRAWINGS

Figure 1:
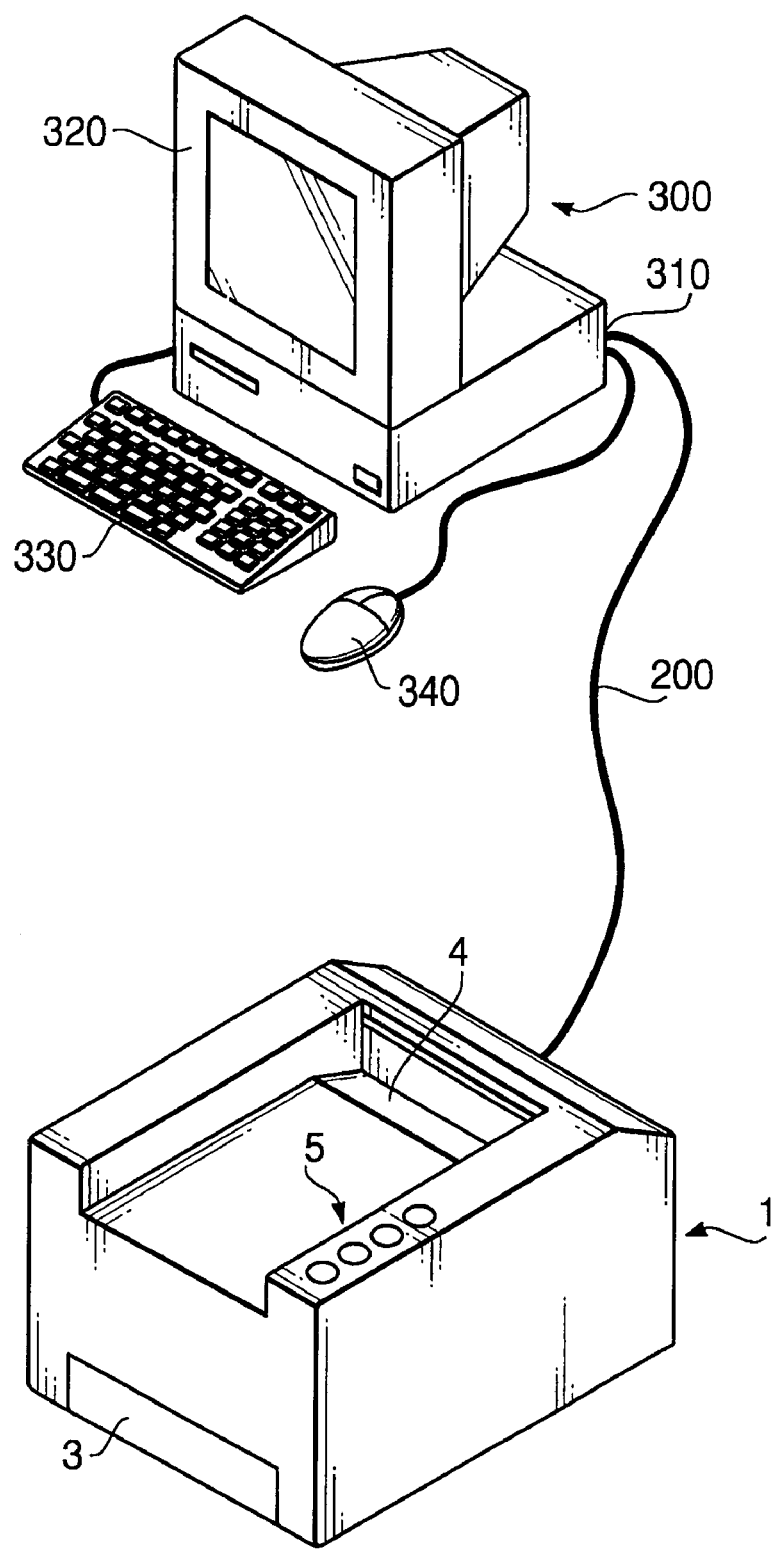
FIG. 1 is a perspective view of a print system to which a print control device according to an embodiment of the invention is applied.
Figure 3:
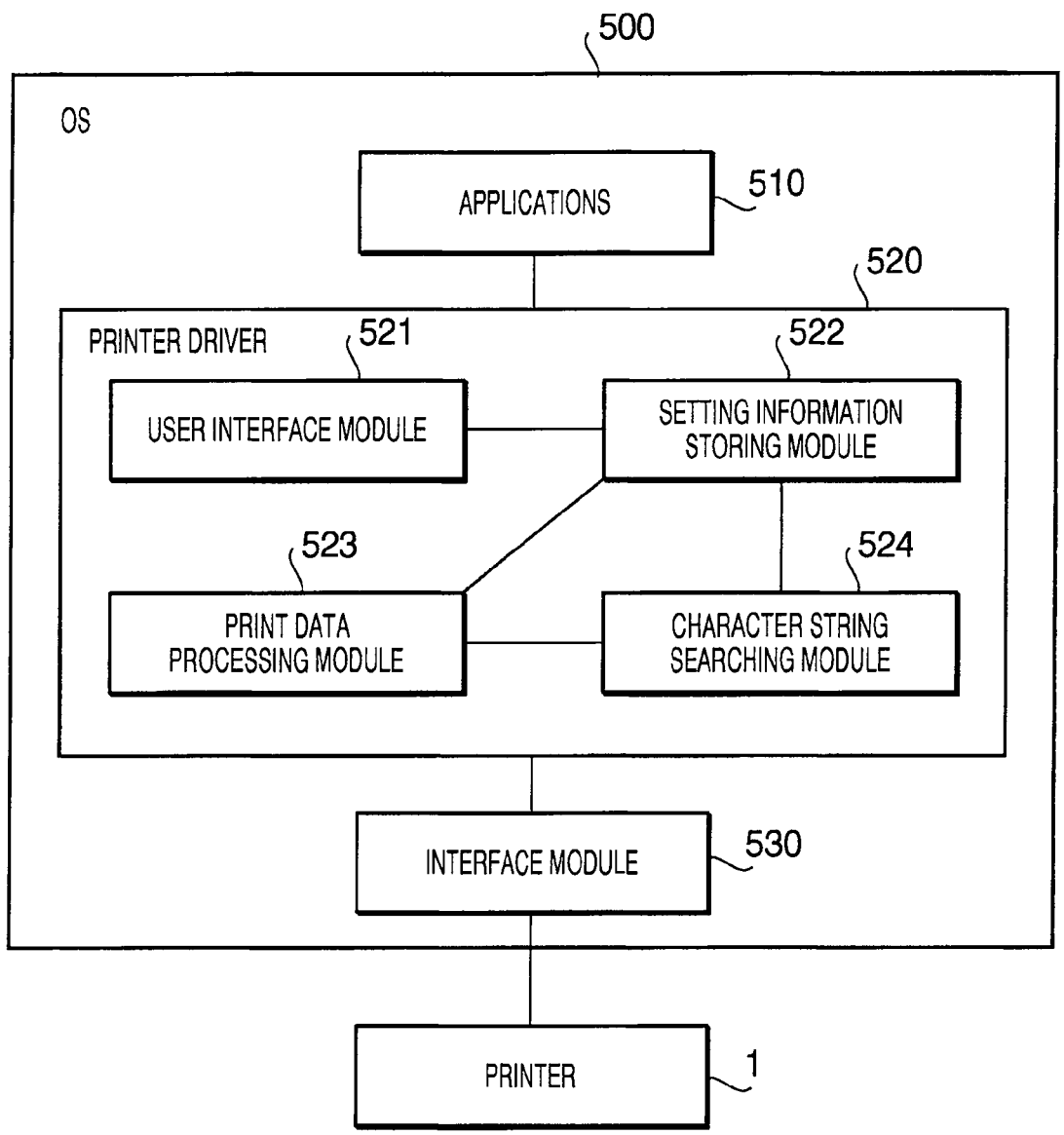

FIG. 3 schematically shows a software configuration of a personal computer of the print system shown in FIG. 1.

Figure 4:
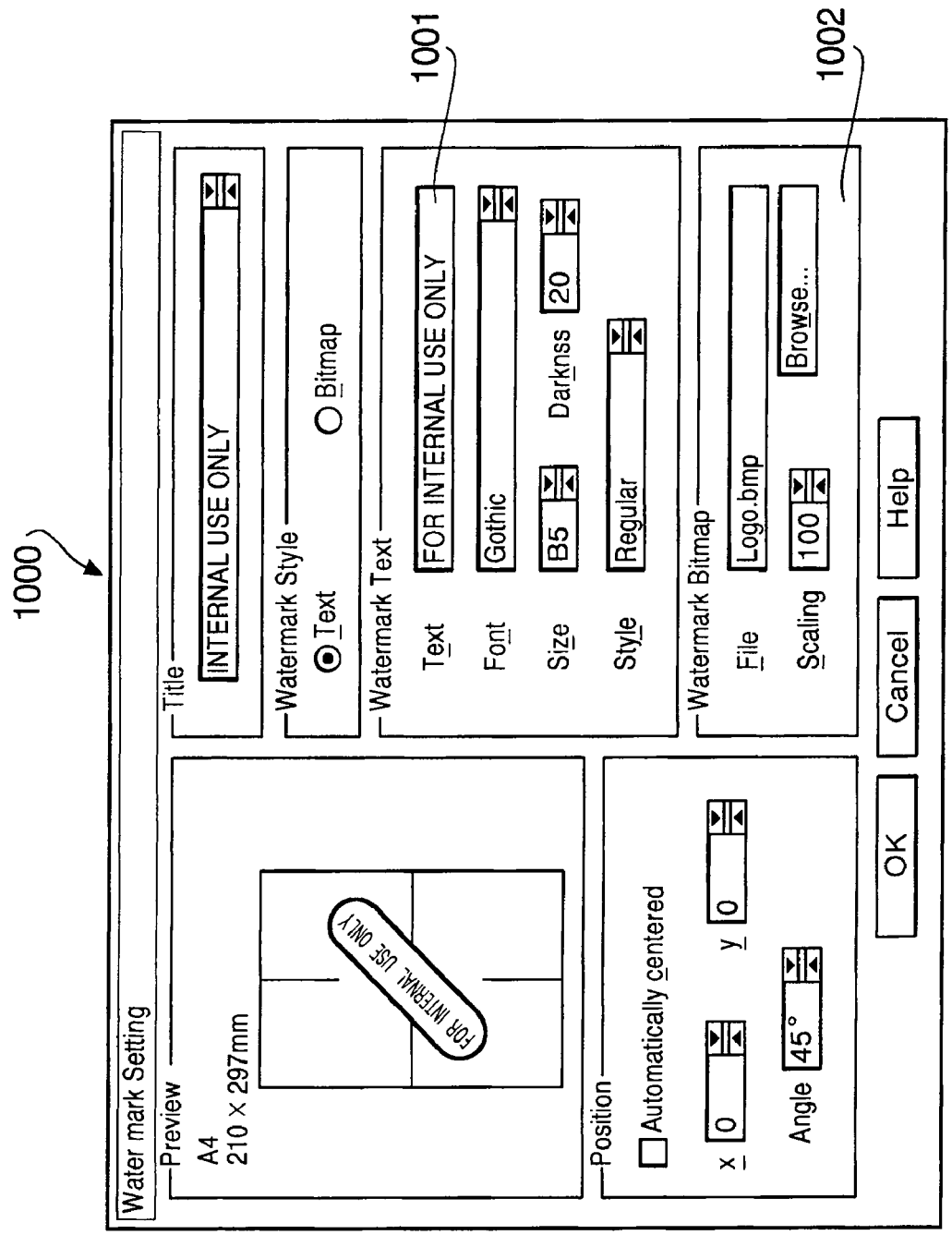

FIG. 4 shows an example of a water mark setting window which allows a user to make various settings regarding printout of the watermark.

Figure 5:
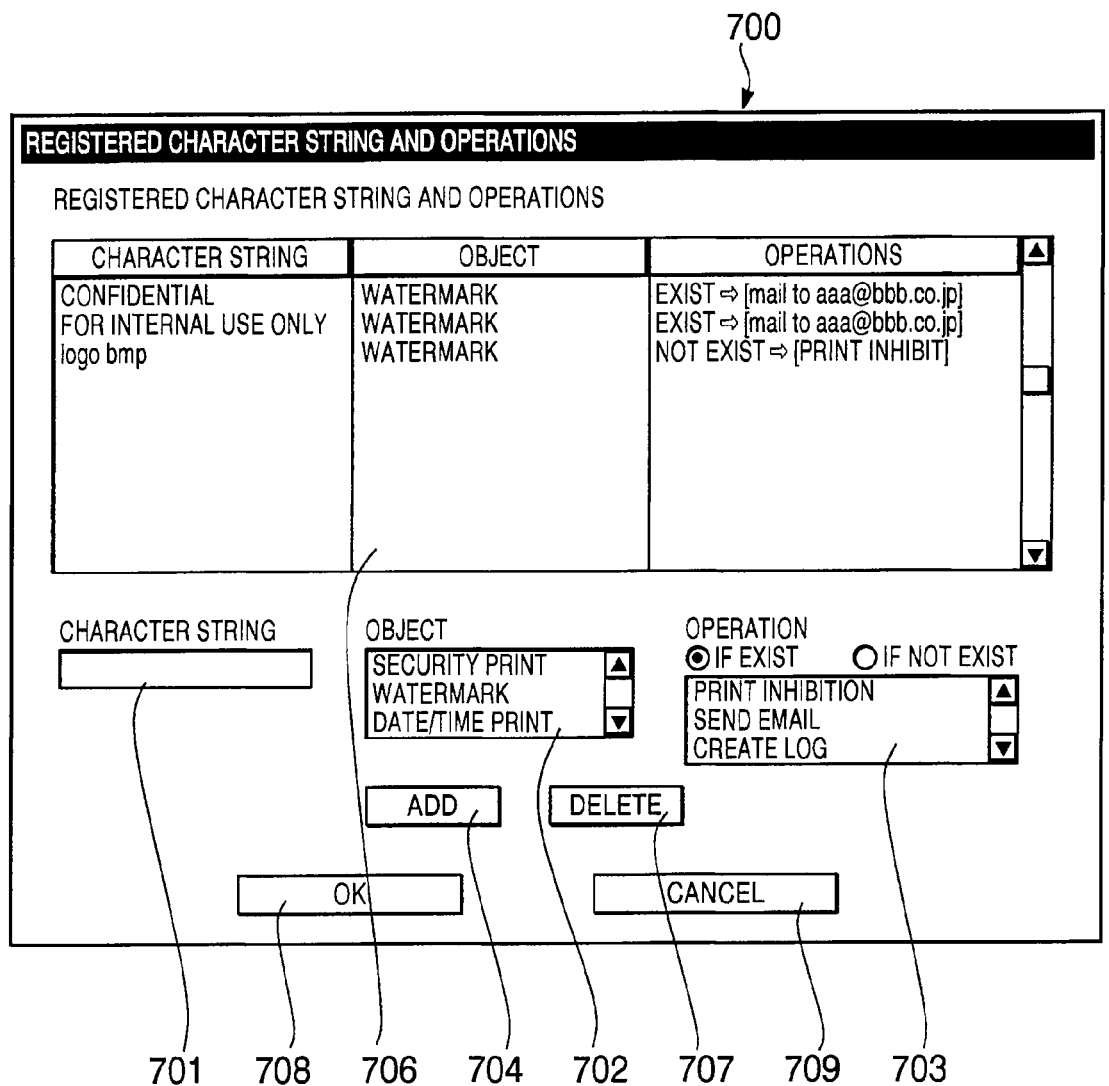

FIG. 5 shows an example of search window displayed on the personal computer of the print system shown in FIG. 1.

Figure 6:
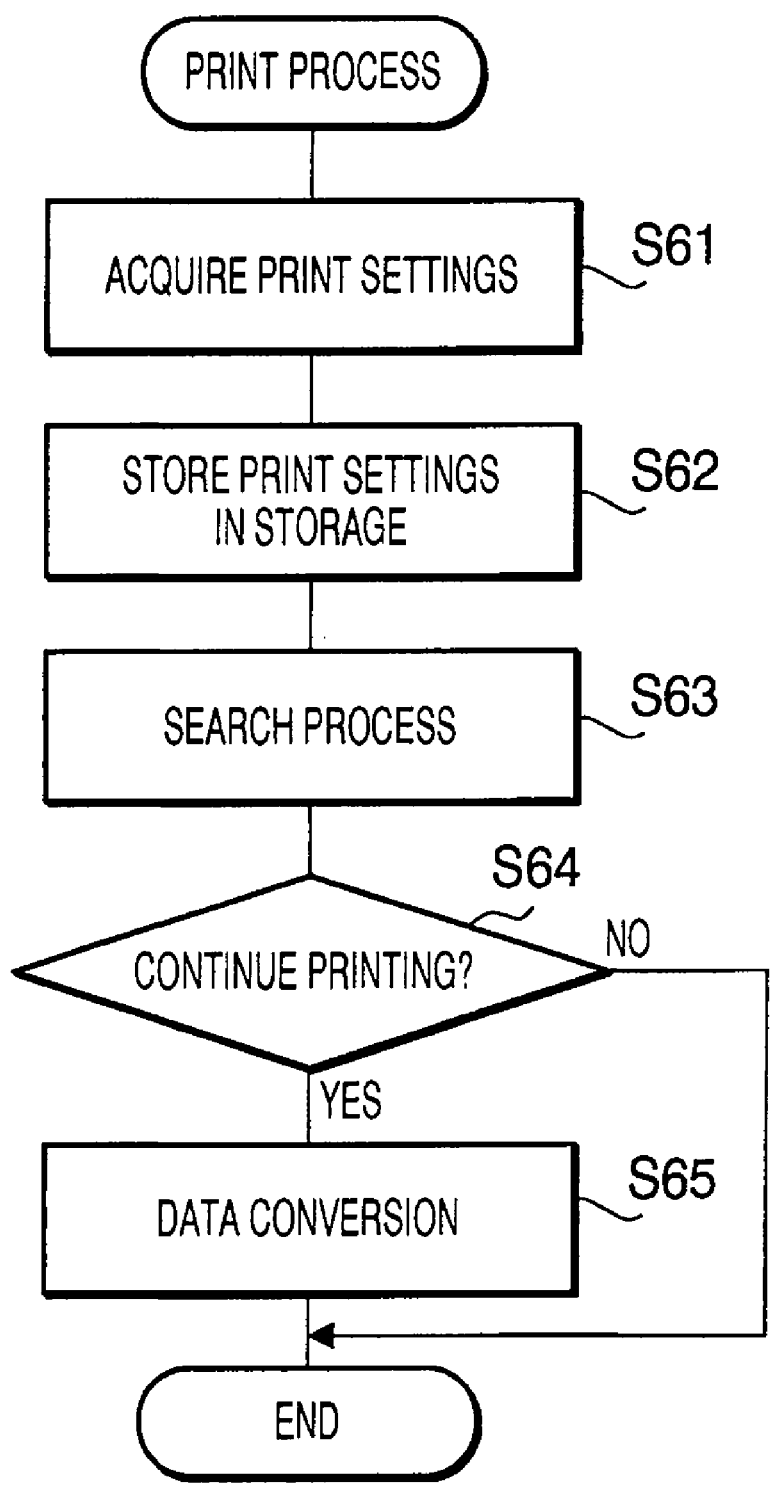

FIG. 6 is a flowchart illustrating a print job process executed by the personal computer of the print system shown in FIG. 1.

Figure 7:
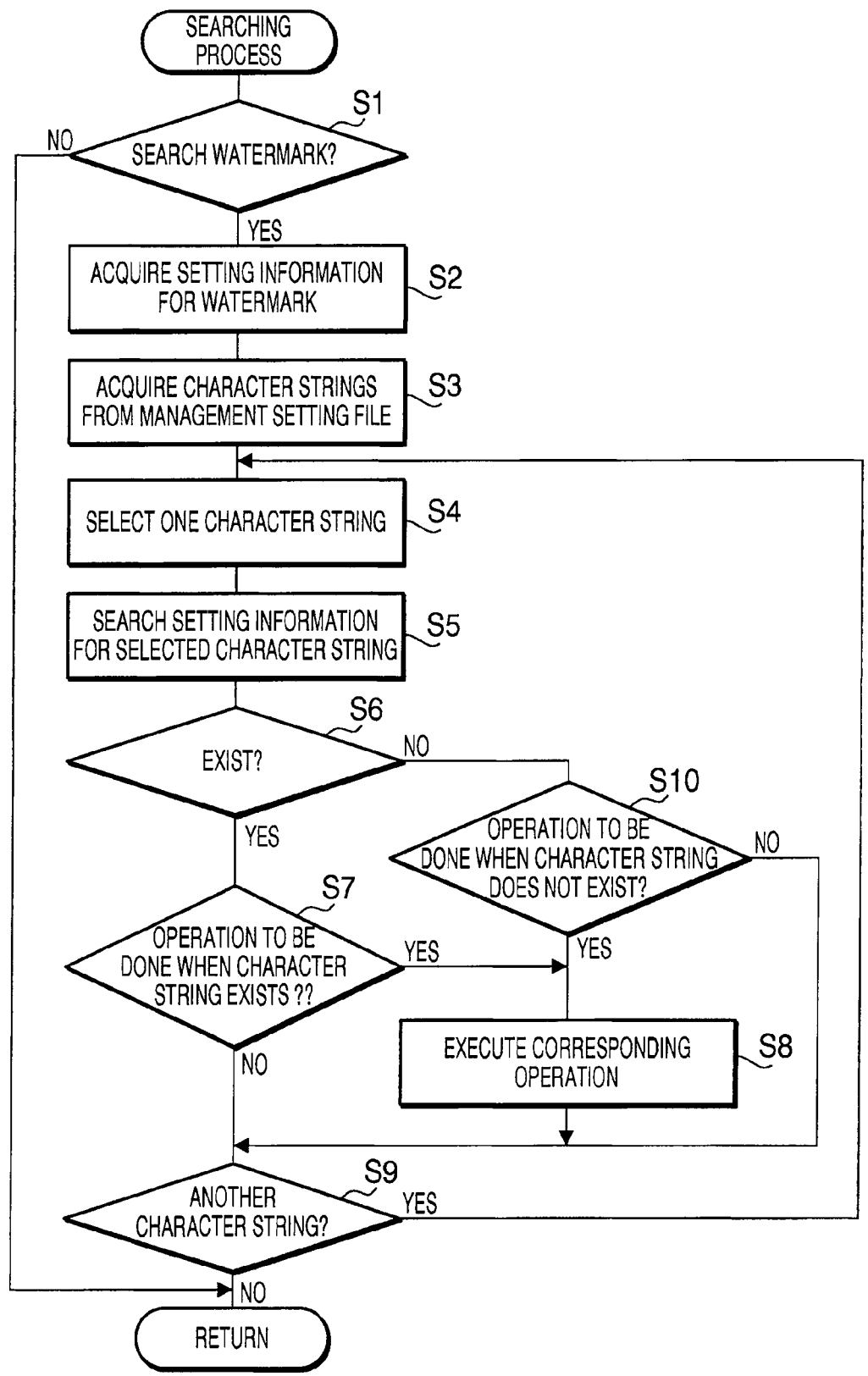

FIG. 7 is a flowchart illustrating a search process executed by the personal computer of the print system shown in FIG. 1.

DETAILED DESCRIPTION

Hereinafter, a print system according to aspects of the present invention will be described with reference to the accompanying drawings.

FIG. 1 is a perspective view of the print system to which the print control device according to the invention is applicable. As shown in FIG. 1, the print system is provided with a color laser printer (hereinafter, simply referred to as a "printer" 1, a personal computer (hereinafter, referred to as the PC) 300 which serves as the print control device according to the present invention. The PC 300 is implemented with a printer driver 520 (see FIG. 3), which controls printing jobs.

In an example shown in FIG. 1, the printer 1 and the PC 300 are directly connected with a cable 200. It should be noted that a configuration of the print system need not be limited to the configuration shown in FIG. 1, and the printer 1 and the PC 300 may be configured to communicate using infrared light communication system, or the printer 1 and the PC 300 may be interconnected via a network such as a LAN (Local Area Network).

The printer 1 is provided with a well-known printer engine 2 (see FIG. 2) which is configured to form a color image in accordance with an electrophotographic imaging method, using yellow, magenta, cyan and black toners. The printer engine 2 forms an image on each printing sheet (not shown) which is accommodated in a sheet tray 3 and fed one by one. The printing sheet on which the image is formed is discharged from the printer 1 and placed on a stacker 4 one by one. As shown in FIG. 1, on an upper surface of the printer 1, an operation panel 5 through which the user can make various settings and input various instructions is provided.

Figure 2:
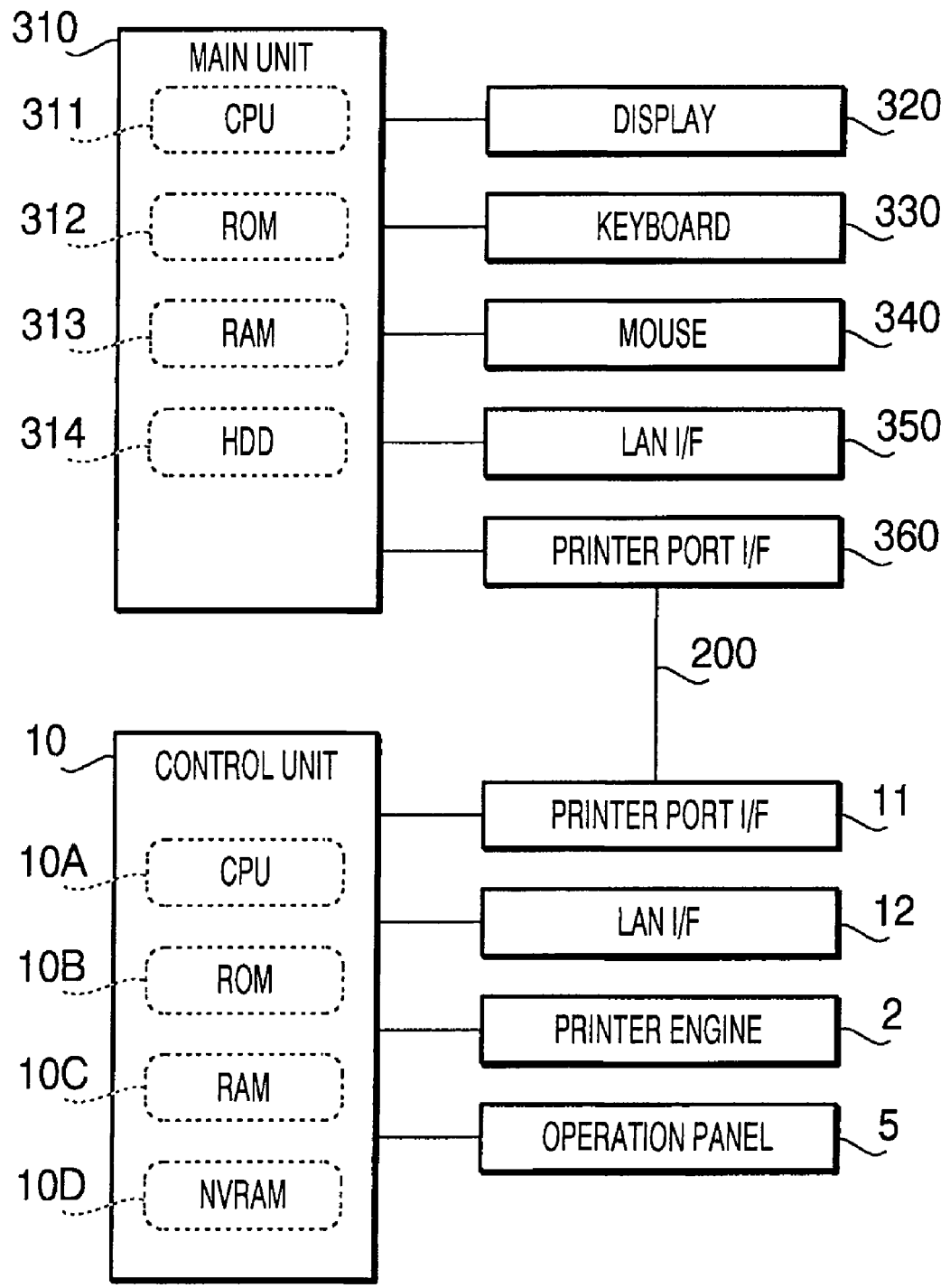
FIG. 2 is a block diagram showing a control system of the print system shown in FIG. 1.

FIG. 2 shows a block diagram schematically illustrating a configuration of a control system of the print system. As shown in FIG. 2, a main unit 310 of the PC 300 is provided with a CPU (Central Processing Unit) 311, a ROM (Read Only Memory) 312, a RAM (Random Access Memory) 313 and an HDD (Hard Disk Drive) 314. The HDD 314 has a storage area on which a print setting file containing setting information, which is subject to management, is stored. The print setting file is created by a user of the print system and stored in the predetermined area of the HDD 314. The HDD 314 has another storage area on which a management setting file containing management settings, which are made only by an administrator, is stored.

Further, to the main unit 310, a display unit (e.g., CRT) 320, a keyboard 330 and a mouse 340 are connected as shown in FIG. 1. Further, the main unit 310 is provided with a LAN interface (I/F) 350 for connecting with a LAN (Local Area Network: not shown) and a printer port interface (I/F) 360 for connecting with the printer 1 via the cable 200.

The printer 1 is provided with a control unit 10 which controls the printer engine 2, etc. The control unit 10 is a microcomputer provided with the CPU 10A, ROM 10B and RAM 10C. The control unit 10 is further provided with a NVRAM (Non-Volatile RAM) 10D, which is configured such that data stored therein is not deleted even if the printer 1 is powered off.

The control unit 10 is connected with the printer engine 2 and the operation panel 5. Further, the control unit 10 is connected with a printer port interface (I/F) 11 for connecting with the PC 300 via the cable 200, and a LAN interface (I/F) 12 for connecting with the LAN. It should be noted that the printer 1 and the PC 300 may be connected to a network such as the LAN via the LAN interfaces 12 and 350.

FIG. 3 is a block diagram showing a software configuration of the main unit 310. As shown in FIG. 3, an OS (Operating System) 500 of the main unit 310 includes various applications 510 such as word processing application and drawing application, a printer driver 520 for converting data output by respective applications to print data which is printed out by the printer 1, and an interface module 530 which receives the print data from the printer driver 520 and transmits the print data to the printer 1.

The printer driver 520 includes a user interface module 521 for displaying a well-known user interface (i.e., a print setting window) on the display 320. The user interface displayed on the display 320 allows a user to make various print settings, which includes settings of the watermark, security printing, date/time printing, and the number of copies. The printer driver 520 further includes a setting information storing module 522 for storing in storage in HDD 314 the print setting information (i.e., the print setting file) representing the print settings made by the user through the user interface displayed on the display 320, print data processing module 523 for converting the data output by the applications into the print data in accordance with the print setting information stored in the setting information storing module 522, and character string searching module 524 for searching the print setting information (i.e., the print setting file) for character strings which are set as described below.

FIG. 4 shows a window 1000, which is an example of the user interface the user interface module 521 displays on the display 320. When a print job is to be executed, the user can create a watermark by inputting a character string into the input area 1001, or by retrieving an image file representing a logo and the like using the user interface 1002. Specifically, when the user creates a print job, by inputting text in the input area 1001 and/or by selecting an image file containing an image to be used as the logo through the user interface 1002, the watermark can be created. As described above, the watermark thus created is stored in HDD 314 as contents of the print setting file by the setting information storing module 522.

According to the embodiment, the administrator can define a relationship between character strings to be printed as the watermark and operations to be executed. That is, if the watermark having a predetermined character string is set, the character string searching module 524 searches the watermark for the predetermined character string, and an operation corresponding to the predetermined character string is executed. A file defining such a relationship is stored as a management setting file, which is also stored in HDD 314 by the setting information storing module 522.

FIG. 5 shows an example of a character string search setting window (hereinafter, referred to as a search setting U/I (User Interface)) 700 for managing the operations corresponding to the character strings included in the watermark, respectively. Specifically, the administrator can define the relationship between a character string included in the watermark and the operation of the printer through the search setting U/I 700. As described above, the file defining the character strings and corresponding operations is stored as the management setting file.

When the administrator inputs a predetermined keyword, the search setting U/I 700 is displayed on the display 320. As shown in FIG. 5, the search setting U/I 700 includes a character string input section 701 in which a character string to be searched is input using the keyboard 330, a search target selecting section 702 which allows the administrator to select an object which is subject to the search with a click of the mouse 340, and an operation selecting section 703 which allows the administrator to select an operation with a click of the mouse 340.

In the exemplary search setting U/I 700 shown in FIG. 5, the administrator can select one of "SECURITY PRINT", "WATERMARK", "DATE/TIME" and the like which are listed in the search target selecting section 702. If, for example, the administrator selects "SECURITY PRINT" from the list shown in the search target selecting section 702, it becomes possible to input a password, which is prohibited to use, such as "0000" in the character string input section 701. If the administrator selects "WATERMARK" from the list in the search target selecting section 702, it becomes possible to input a character string, which will be printed as a watermark (e.g., "FOR INTERNAL USE ONLY") or a name of a file containing an image to be printed as the watermark, in the character string input section 701. If the administrator selects "DATE/TIME" from the list shown in the search target selecting section 702, it becomes possible to input a character string (e.g., MM/DD/YY) affixed as date information can be input in the character string input section 701.

For each combination of the character string input in the character string input section 701 and the selection in the search target selecting section 702, the administrator can set an operation when the combination exists or does not exist by selecting one of the items listed in an operation selecting section 703. As an operation, in this example, the administrator can select one of prohibition of the print data, transmission of an e-mail to a predetermined e-mail address (e.g., to the administrator), and generation and storing of log of the print data.

After desired selections are made in the search target selecting section 702 and operation selecting section 703 and the desired character string is input in the character string input section 701, in response to click of an "ADD" button 704 by the administrator, the combination of the character string, search target item and operation is temporarily stored in a work file on the HDD 314 as management setting information, and the combination is displayed in a setting information displaying section 706. According to the example shown in FIG. 5, if the print data includes a character string "CONFIDENTIAL" or "FOR INTERNAL USE ONLY" as the watermark, an e-mail message is sent to <aaa@bbb.co.jp> which may be the e-mail address of the administrator, and if the print data does not include a file name "logo.bmp" representing an image as the watermark, printing of the print data is prohibited.

As a well-known user interface, when the administrator selects one of the listed combinations displayed in the setting information displaying section 706 and clicks a "DELETE" button 707, the combination (i.e., management setting information) is deleted from the work area, and the display itself in the setting information displaying section 706 is also deleted. After the above-described management setting operation is finished, in response to a click of an "OK" button 708, the management settings indicated in the setting information displaying section 706 are validated, and the management setting information stored in the work file is stored as a management setting file. If the management setting file exists, the work file overwrites the existing management setting file. Therefore, the previous management setting information stored in the existing management setting file is replaced with the new management setting information set through the search setting U/I 700. If the administrator clicks a "CANCEL" button 709 instead of the "OK" button 708, the management settings made through the search setting U/I 700 are invalidated, and the work file is deleted. In this case, the management setting file is not newly created (or updated). Thereafter, the search setting U/I 700 is closed.

It should be noted that when the administrator inputs a predetermined keyword to display the search setting U/I 700, the management setting information stored in the existing management setting file is retrieved and reflected (displayed) in the setting management information displaying section 706. Therefore, the administrator can add new settings and edit the previous settings.

Next, a printing process will be described. It should be noted that in the printing process described below, a case where the "WATERMARK" is selected as the search target will be described. Similar processes will be executed when other search targets are selected, and description thereof will be omitted for brevity.

FIG. 6 is a flowchart illustrating the printing process which is executed by the CPU 310. The printing process is started when the user of the PC 300 operates an application 510 to start printing, and the printer driver 520 starts operating.

When the printing process is started, the user I/F module 521 displays a watermark setting U/I as shown in FIG. 4 on the display 320 so that the user can set the character string and/or logo (i.e., image file) as the watermark. When input by the user is completed, the process acquires the print settings input by the user (S61), and the setting information storing module 522 stores the print settings in HDD 314 as the print setting file (S62).

In S63, the character string searching process is executed, in which the print settings made by the user are examined. The character string searching process will be described later referring to FIG. 7. After execution of the character string searching process (S63), the process judges, in S64, whether the printing process should be terminated based on the result of the examination made in the character string searching process.

If the process determines that the printing process is to be continued (S64: YES), the process proceeds to S65, where the process allows a print data processing module 523 to generates the print data. That is, in S65, the print data processing module 523 superimposes an image of the watermark (character string and/or images) on the image output by the application (i.e., the job data) based on the watermark which is stored in the HDD 314 by the setting information storing module 522 as the print setting file, and converts the image data output by the application with the superimposed watermark into print data (S65), which is transmitted from the interface module 530 to the printer 1.

If the printing process is to be terminated (S64: NO), the printing process is terminated without generating the print data.

Next, a character string searching process, which is called in S63 of the printing process (FIG. 4) will be described. FIG. 7 is a flowchart illustrating the character string searching process. As shown in FIG. 7, in S1, the process judges whether the print setting file stored in the HDD 314 includes the watermark. If the watermark is not included (S1: NO), the process is terminated without any operation executed. In such a case, in FIG. 6 process proceeds from S63, to S64 and then S65.

If the watermark is included in the print setting file (S1: YES), the process proceeds to S2. In S2, the process acquires the setting information regarding the watermark set by the administrator from the management setting file stored in HDD 314 by the setting information storing module 522. Then, in S3, the process acquires character strings which are set for the watermark. If the management setting file stores the management settings shown in FIG. 5, three character strings, "FOR INTERNAL USE ONLY", "CONFIDENTIAL" and "logo.bmp" are acquired as character strings to be searched.

In S4, the process selects one of the character strings acquired in S3, and in S5, the process searches the watermark (i.e., the print setting file) for the character string selected in S3. If the character string selected in S3 is included in the watermark (S6: YES), the process proceeds to S7, where the process judges whether an operation corresponding to the character string is to be done when the character string is included in the watermark in S7. If the management setting file defines that the operation corresponding to the character string is to be done when the character string is included in the watermark (S7: YES), the process proceeds to S8, where the process executes the operation corresponding to the watermark. If the management setting file defines that the operation corresponding to the character string is to be done when the character string is not included in the watermark (S7: NO), the process proceeds to S9.

For example, when the management setting file contains the management settings as shown in FIG. 5, if the "CONFIDENTIAL" or "FOR INTERNAL USE ONLY" is included in the watermark (S6: YES), the setting defines that an e-mail message is to be sent when the character string is included (S7: YES), and the process sends the e-mail message to the address set in the management setting file (S8). Regarding the character string "logo.bmp", the management setting file defines that an operation is to be performed when the character string is not included in the watermark (S7: NO), therefore, if the character string "logo.bmp" is included in the watermark, the process performs no operation and proceeds to S9.

In S9, the process judges whether there exists another character string which is acquired in S3 and has not yet been selected for search in S4. If there exist another character string subject to search (S9: YES), the process returns to S4, and a character string which has been acquired in S3 and has not yet been selected in S4 is selected (S4), and the above-described searching operation is executed using the newly selected character string.

If the process judges that the selected character string is not included in the watermark (S6: NO), the process judges whether the management setting file defines that the operation corresponding to the currently selected character string is to be executed when the character string is not included in the watermark (S10). If the management setting file defines that the operation corresponding to the currently selected character string is to be executed when the character string is not included in the watermark (S10: YES), the process executes the operation corresponding to the currently selected character string (S8), and proceeds to S9. Otherwise (S10: NO), the process proceeds to S9 skipping S8.

For example, when the management setting file contains the management settings as shown in FIG. 5, if the character string "logo.bmp" is selected and the character string is not included in the watermark (S10), the process inhibits the printing operation (S8).

As above, by repeatedly executing S5-S10 for each of the character strings acquired in S3, and when the process judges that there does not exist a character string which was acquired in S3 and has not been selected in S4 (i.e., for all the character strings acquired tin S3, the operation of S5-S10 has been executed) (S9: NO), the process is terminated.

As described above, according to the embodiment, depending on whether a predetermined character string is included in the watermark, a predetermined operation corresponding to the character string can be executed. According to the exemplary management setting shown in FIG. 5, if the watermark "CONFIDENTIAL" or "FOR INTERNAL USE ONLY" is to be printed together with the data output by the application 510, an e-mail message notifying that such a printing job is to be executed is notified to the administrator. If a predetermined image (e.g., a logo of a company) is to be printed as a watermark (i.e., an image file "logo.bmp" is to be printed) together with the job data output by the application 510, the printing operation is inhibited. Therefore, according to the embodiment, an operation which cannot be done by searching the job data output by the application 510 can be executed. Further, according to the embodiment, the searching operation is executed by the printer driver 520 but not by the printer 1, the operation by the printer 1 (i.e., a printing speed) will not be decreased.

The present invention need not be limited to the configuration described above, and can be modified in various ways without departing the scope of the invention.

For example, according to the embodiment described above, when an image file is designated as the watermark, a file name is input as the character string to be searched. This configuration may be modified such that a candidate display button functioning to display images which can be used as the watermark is included in the setting U/I 700 so that the administrator can visually select the file without inputting the file name.

According to the embodiment, only the character string set by the printer driver 520 is subject to search. This can be modified such that the character string set by the applications 510 is also searched.

According to the embodiment, the HDD 314 is used for storing the print setting file, management setting file and the programs. It is possible that a recording medium need not be limited to the HDD 314, and any other equivalents (e.g., ROM, RAM, CD-ROM, flexible disk, removable disk, magneto-optical disc, and the like) may be alternatively or optionally used. Further, a file server on the Internet and the like may also be used as the recording medium.

What is claimed is:

1. An apparatus comprising:
 a processing unit;
 memory for storing computer readable instructions, which when executed by the processing unit, cause the apparatus to control a printer to execute a printing operation by
  converting job data output by an application and device side data set by the apparatus into print data;
  selecting data to be searched from the device side data in accordance with a user operation;
  setting, in association with a predetermined operation selected in response to the user operation, a character string as a condition for searching the device side data;
  searching the data selected to be searched based on the set character string; and
  executing the predetermined operation associated with the character string when the searching finds the character string in the searched data,
  wherein the predetermined operation is selected from among a notification to an administrator, recordation of a log of the printing operation, and inhibition of the printing operation.

2. The apparatus according to claim 1, wherein a character string corresponding to data of a watermark to be visibly printed together with the job data is included in the device side data.

3. The apparatus according to claim 1, wherein the device side data is added to the job data output by the application.

4. A non-transitory computer accessible recording medium containing instructions that, when executed, cause a computer to control a printer to execute a printing operation, by performing the steps of:
 converting job data output by an application and device side data representing print settings generated by a printer driver into print data;
 selecting data to be searched from the device side data in accordance with a user operation;
 setting, in association with a predetermined operation selected in response to the user operation, a character string as a condition for searching the device side data;
 searching the data selected to be searched based on the set character string; and executing the predetermined operation associated with the character string when the searching finds the character string in the searched data, wherein the predetermined operation is selected from among a notification to an administrator, recordation of a log of the printing operation, and inhibition of the printing operation.

5. The non-transitory computer accessible recording medium according to claim 4, wherein the device side data is added to the job data output by the application.

6. A method for controlling a printer to execute a printing operation, comprising the steps of converting job data output by an application and device side data representing print settings generated by a printer driver into print data;

selecting data to be searched from the device side data in accordance with a user operation;

setting, in association with a predetermined operation selected in response to the user operation, a character string as a condition for searching the device side data;

searching the data selected to be searched based on the set character string; and executing the predetermined operation associated with the character string when the searching finds the character string in the searched data, wherein the predetermined operation is selected from among a notification to an administrator, recordation of a log of the printing operation, and inhibition of the printing operation.

7. The method according to claim 6, wherein a character string corresponding to data of a watermark to be visibly printed together with the job data is included in the device side data.

8. The method according to claim 6, wherein the device side data is added to the job data output by the application.

* * * * *